United States Patent [19]

Bechtold

[11] Patent Number: 4,941,316

[45] Date of Patent: Jul. 17, 1990

[54] CHAIN ASSEMBLY

[76] Inventor: Stephen K. Bechtold, 306 Ocean Ave., Northport, N.Y. 11768

[21] Appl. No.: 332,468

[22] Filed: Apr. 3, 1989

Related U.S. Application Data

[62] Division of Ser. No. 96,947, Sep. 15, 1987, Pat. No. 4,878,345.

[51] Int. Cl.$^5$ ............................................. F16G 13/20
[52] U.S. Cl. ................................................. 59/78; 59/6; 59/8; 59/13; 59/35.1; 59/901; 49/325; 292/264
[58] Field of Search .................. 49/325, 338; 59/78.1, 59/4, 5, 6, 7, 8, 13, 78, 35.1, 901; 292/264

[56] References Cited

U.S. PATENT DOCUMENTS

| | | | |
|---|---|---|---|
| 2,832,590 | 4/1958 | Youngberg | 49/325 |
| 3,546,875 | 7/1968 | Weber | 59/78.1 |
| 3,716,986 | 2/1973 | Cork et al. | 59/78.1 |
| 3,782,670 | 1/1974 | Kielma | 59/78.1 |
| 3,911,802 | 10/1975 | Morden | 49/325 |
| 4,014,136 | 3/1977 | Hemens et al. | 49/325 |
| 4,521,993 | 6/1985 | Tacheny et al. | 49/325 |
| 4,800,714 | 1/1989 | Moritz | 59/78.1 |
| 4,807,432 | 2/1989 | Mauri | 59/78.1 |

FOREIGN PATENT DOCUMENTS 1091528 11/1967 United Kingdom .................. 49/325

*Primary Examiner*—David Jones
*Attorney, Agent, or Firm*—Hoffmann & Baron

[57] ABSTRACT

The present invention discloses an improved chain assembly and a method for making the same. In general, the method of making a chain assembly in accordance with the present invention, comprises forming a plurality of links having a preselected shape and placement of apertures therein. A plurality of wire blanks are formed having an outer diameter to permit insertion into the apertures of the links. Such link is retained in a fixed position and a wire blank is inserted into each aperture of the link. On one end of each wire blank, a head is formed having a diameter larger than the aperture into which the wire blank is inserted. A mating link is placed into engagement with each link containing wire blanks with the end of each blank inserted in one aperture of the mating link in a manner to form a chain assembly. On the other end of each wire blank, a head is formed to complete interlocking of the links and blanks in forming the chain assembly.

5 Claims, 4 Drawing Sheets

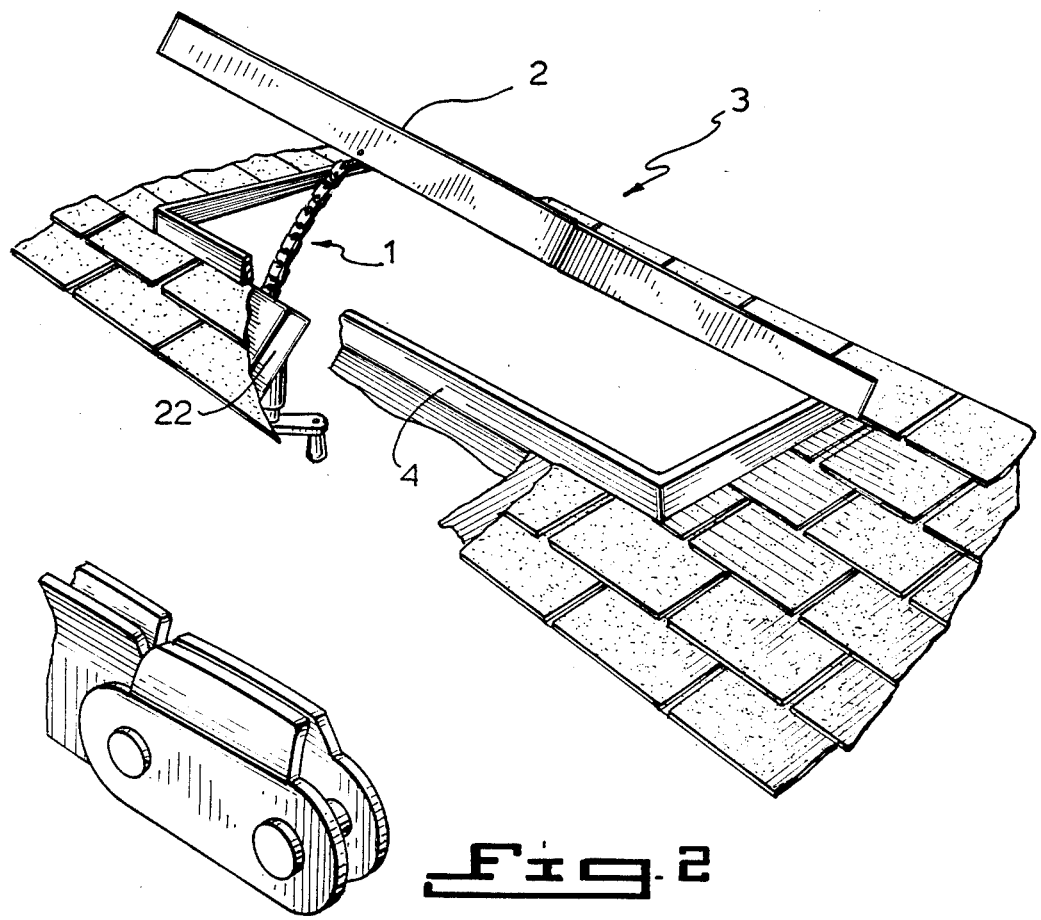
Fig. 1
Fig. 2
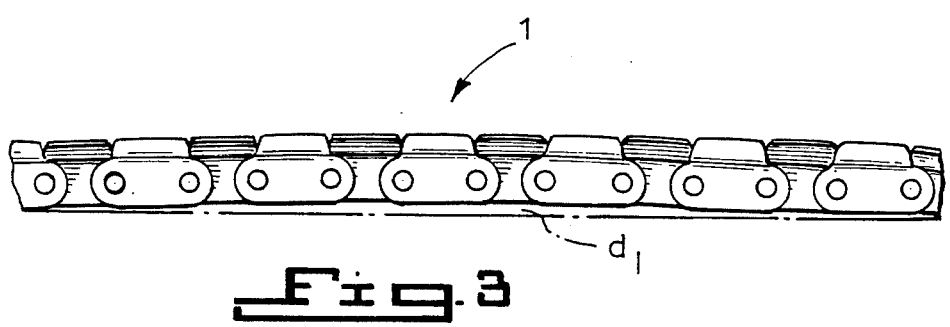
Fig. 3

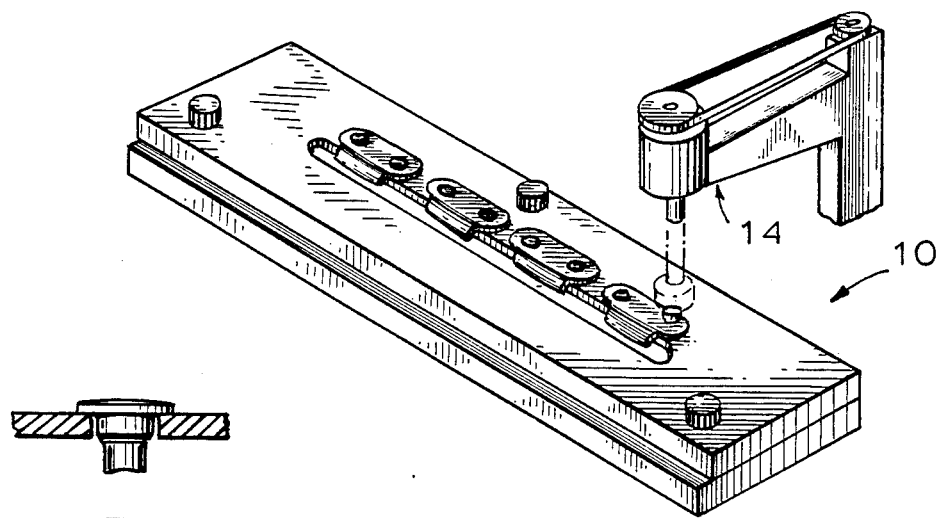
Fig. 8D
Fig. 8E
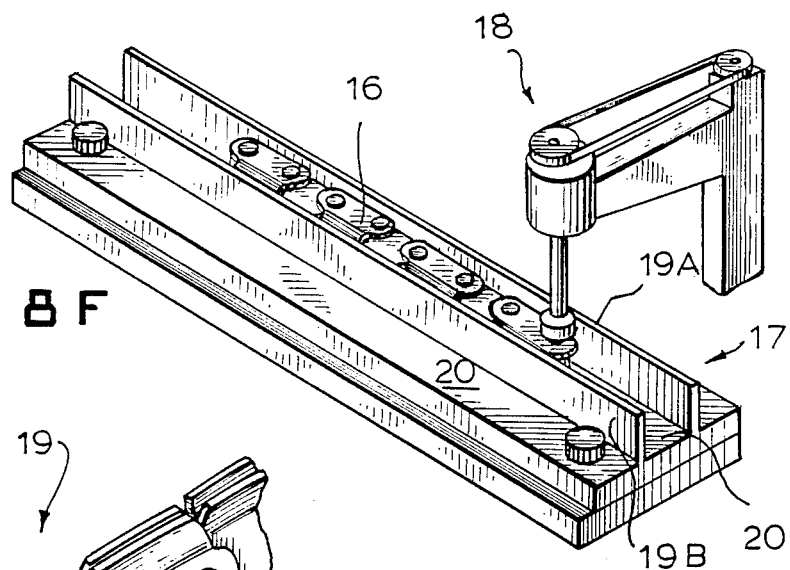
Fig. 8F
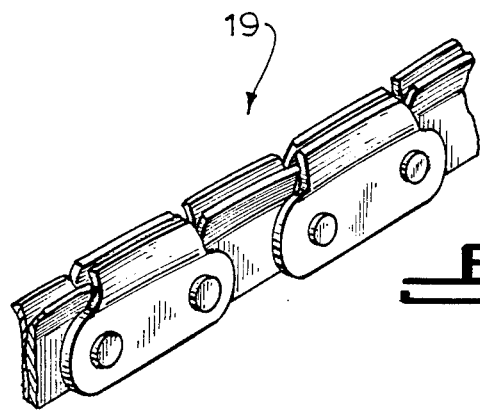
Fig. 8G

CHAIN ASSEMBLY

This is a divisional of co-pending application Ser. No. 07/096,947 filed on Sept. 15, 1987 now U.S. Pat. No. 4,878,345.

FIELD OF INVENTION

The present invention relates in general, to methods of making high tolerance chain assemblies and, in particular, to methods for making chain assemblies used in window operators which are designed to push windows with an assembled chain under compression and require that the assembled chain be capable of maintaining substantial structural rigidity and rectilinearity when extended to approximate a straight line, and simultaneously provide a sufficient degree of lateral flexure.

BACKGROUND OF THE INVENTION

In general, window chain assemblies comprise links fastened to one another by rivets. The links are usually stamped out utilizing conventional metal stamping techniques after which several necessary secondary operations are required to produce a finished link. The blanks, from which the rivets are made, are usually formed by wire drawing techniques. Examples of conventional methods for fabricating chains of various types can be found in U.S. Pat. Nos. 1,873,619, 3,125,850, 3,370,416 and 4,037,403.

However, the above-mentioned U.S. patents have not specifically or indirectly addressed the unique problems arising in the construction of chains employed in skylight window operators.

In particular, U.S. Pat. No. 4,521,993 to Tacheny et al discloses a chain operator for a window, especially designed for a skylight window. Chain operators of this general type include a chain assembly constructed from a plurality of solid links and a plurality of U-shaped links with the U-shaped links being positioned in an end-to-end abutting relation, and the solid links having a thickness to closely fit within the U-shaped links. In this general application where the chain assembly of the window operator is designed to push the window unit under compression rather than pull it under tension the chain links must be constructed to provide substantial rigidity for the chain when it is in a straight configuration, so that the chain can transmit force to the swinging window unit for opening and closing thereof. The chain must also possess the requisite degree of lateral flexure to conform to the arcuate path traversed by swinging window unit from the window liner.

In prior art skylight chain constructions, it has thus become customary for the links thereof to have coacting shapes to facilitate movement of the chain between straight and curved configurations, while maximizing the strength thereof. Also, for increased strength, the rivets have been provided with large heads pivotally interconnecting the opposite ends of a solid link and a pair of U-shaped links.

Therefore, in order to ensure that the finished chain assembly has (i) a high degree of structural rectilinearity in its extended configuration, as well as (ii) possesses the requisite degree of lateral flexure to conform to the arcuate path traversed by a swinging window unit from the window liner window operator chain assemblies require extremely high tolerances. However, with conventionally stamped links, there are several inherent limitations in the process thereof which provide links with specifications falling outside acceptable tolerances required by window operator chain assemblies. Specifically, the links produced from conventional stamping methods have associated therewith, tapers (i.e., edges) with die breaks up to 30°, corner tears, waves, poor surface quality and break out, in addition to not being highly planar. Also using conventional stamping techniques, any additional structural features that a link must have for a particular chain assembly design must be produced by additional operations. As with the blanks produced from conventional wire drawing techniques high tolerances on the order of 0.001 inch in length are typically not achievable.

In constructing a chain assembly for use in a window operator as hereinbefore described, the requirement of high tolerance in the dimension of the parts cannot be overemphasized, since the chain assembly usually requires the assemblage of fifty or more links with rivets formed from blanks, and the resulting or total error of the final chain assembly is the sum of all the errors in the dimensions of the comprising components. Thus, if the tolerances of each of the individual components are not maintained within a high degree of accuracy, then a resultant chain assembly cannot satisfy the following criterion: (i) that resultant chain assembly be sufficiently rigid and rectilinear along its longitudinal dimension when in its extended configuration, and (ii) that it possess sufficient lateral flexure as to conform to the arcuate traverse of the swinging window unit from the liner to which the swinging window unit is mounted.

While the prior art has addressed the problem associated with inadequately configured chain assemblies with respect to criterion (i) and (ii) discussed hereabove, the solutions thereto have been wholly inadequate for purposes of obtaining the objects of the present invention. Therefore, conventional chain construction techniques have been retained and post assembly corrective measures have been developed to compensate for the inherent shortcomings of conventional chain construction methods. Such conventional chain construction techniques involve the intentional introduction of "error" in each link such that the assembled chain assembly possesses a predetermined degree of arcuate curvature, after which corrective measures are taken. The principal technique used to correct the shape of an assembled chain for a window operator has been to use jaw-like apparatus to "overbend" completely assembled chains having predetermined arcuate curvature to thereby correct its shape as to satisfy criterion (i) and (ii) hereabove, but this operation results of course, in loosening or tightening the component parts and preventing the establishment of precise interrelationships therebetween. Moreover, since resultant chain assemblies will not require the same degree of overbending to correct their shapes, this method more often than not produces chain assemblies which fail to meet criterion (i) and (ii) as desired. One important consequence of this overtightening and loosening of rivets is that this renders the chain assembly extremely stiff at locations along the chain length which prevents the same from turning about the drive sprocket of a chain operator. Often, this resistance of the chain to turn about the drive sprocket, causes the chain operator to fail.

As important however, chains made from stainless steel and other metals desired for their non-corrosive properties, cannot be subjected to such overbending procedures to correct the shape of a chain assembly produced from components of low tolerance, as stainless steel and like metals will shear and fracture when subjected to forces associated with overbending procedures. This fact has thus prevented the fabrication of skylight chains from highly desired materials such as stainless steel, and other metals desired for their non-corrosive properties. As a result of this fact, prior art chain assemblies for chain operators have resorted to the use of "mild" steel to fabricate the link plates of chain assemblies. In order to provide a non-corrosive outer coating to the mild steel links, barrel plating processes are typically employed. However, even with the finest plating processes and equipment, uneven plating of link plates occurs, the result of which is premature wearing away of deposited non-corrosive coatings. This renders link plates so exposed susceptible to oxidation and corrosion thereby reducing the quality of appearance and performance of such chain assemblies, and operators employing the same.

Therefore, there is a great need in the art for chain assemblies made of non-corrosive materials, which do not require plating, and which, such as stainless steel, can be used with chain operators for windows.

In view of the above-recognized problems and the prior art solutions thereto, it therefore becomes a primary object of the present invention to provide a method for making chain assemblies for window and like operators, which possess structural features of substantial rectilinearity along its longitudinal dimension when in its extended configuration, and sufficient lateral flexure for conforming to the arcuate traverse of a swinging window unit from its liner.

It is also an object of the present invention to provide a method for making a chain assembly for a window operator, wherein the links and rivets thereof are made of stainless steel, thereby eliminating the requirement of plating link plates with non-corrosive coatings.

It is a further object of the present invention to provide such a method wherein the chain assembly is precision-formed from links and rivets having ultra-high tolerances, as to produce chain assemblies therefrom having the desired degree of longitudinal rectilinearity when extended, and the required lateral flexure to conform to arcuate geometry, without utilizing "overbending" and similar shape-corrective measures.

It is a further object of the present invention to provide such a method utilizing fine blanking metal working principles to form the links of the chain assembly, and a combined "orbital" riveting method and "spinning method" for forming the heads of the rivets which hold the links together.

It is a further object of the present invention to provide such method for making a chain assembly which uses only one type of link to be used in forming the chain assembly.

It is an even further object of the present invention to provide such a method which is capable of mass producing high tolerance chain assemblies at a low cost.

It is an even further object of the present invention to provide such method which is readily adaptable to automated mass production of chain assemblies in accordance with the principles of the present invention.

It is a further object of the present invention to provide a chain assembly produced by such method.

It is an even further object of the present invention to provide a method for making chain assemblies for window operators, which eliminates the requirement of secondary operations such as "overbending" procedures performed on chain assemblies.

SUMMARY OF THE INVENTION

In general, the method of making a chain assembly in accordance with the present invention, comprises forming a plurality of links having a preselected shape and placement of apertures therein. A plurality of wire blanks are formed having an outer diameter to permit insertion into the apertures of the links. Each link is retained in a fixed position and a wire blank is inserted into each aperture of the link. On one end of each wire blank, a head is formed having a diameter larger than the aperture into which the wire blank is inserted. A mating link is placed into engagement with each link containing wire blanks with the end of each blank inserted in one aperture of the mating link in a manner to form a chain assembly. On the other end of each wire blank, a head is formed to complete interlocking of the links and blanks in forming the chain assembly.

In forming the plurality of links, a fine blanking process can be used in which bends are introduced into the shape of each link. The plurality of wire blanks can be formed by drawing wire and shearing the wire into a plurality of predetermined lengths. The blanks can be retained in a fixed position by inserting the same into respective holes of a holding fixture, as to allow one end of the blank to protrude therefrom at a predetermined height above the surface of the holding fixture. The links can then be positioned onto the blanks protruding from the holding fixture, and the holding fixture precisely positioned with respect to a means for forming a head onto the protruding blank. Using an orbital riveting method, the head can be formed onto each protruding blank as to produce a rivet from each blank.

One advantage derived from the orbital riveting process is that the rivet blank does not rotate within the link plate and therefore does not need to be held against rotation during the head forming process. Another advantage is that while the head is being formed, the pressure applied also forces the plastically deformed, i.e., swelled, metal of the blanks to expand into tight frictional engagement with the walls of the circular apertures formed in the link plates. This tight frictional engagement allows a subsequent "spinning" process to be used to form the head on the opposite end of the blank without needing to hold the rivet blank from turning.

In forming heads on the other end of each wire blank, the links and blanks can be positioned into a guide fixture as to dispose the headless ends of the wire blanks, accessible to a means for forming a head. Using a conventional spinning method, heads are then formed on the ends of the wire blanks to thereby complete interlocking of the links and blanks to form the chain assembly of the present invention.

Thus, an even further result of the present invention is to provide a method of making a chain for a window operator, which is simple and employs, in part, readily available technology.

The present invention accordingly comprises the method and chain assembly, together with their steps, parts, components, and interrelationships, which are exemplified in the present disclosure, the scope of which will be indicated by the appended claims.

Other and further objects will be explained hereinafter and will be more particularly delineated in the appended claims, and the other objects of the present invention will, in part, be obvious to one with ordinary skill in the art to which the present invention pertains, and will, in part, appear obvious hereinafter.

BRIEF DESCRIPTION OF THE DRAWINGS

For a fuller understanding of the objects of the present invention, reference is made to the following detailed description of the preferred embodiment, which is to be taken in connection with the accompanying drawings, wherein:

FIG. 1 is a perspective view of a skylight window supported in its open position by a chain window operator, employing the chain of the present invention;

FIG. 2 is a perspective view of a fragment of section of the chain assembly of the preferred embodiment showing two link plates with adjacent links connected together by rivets;

FIG. 3 is a side view of a chain assembly for a window operator fabricated in accordance with the method hereof;

FIG. 8D is a perspective view of the holding fixture showing links positioned onto the blanks protruding from the upper plate;

FIG. 8E is a sectional side view of a fragmentary portion of a link plate through which a rivet passes with a head formed thereon;

FIG. 8F is a perspective view of the guide fixture showing a chain assembly positioned therein as to dispose the ends of the rivets without heads formed thereon accessible to apparatus for forming a head; and FIG. 8G is a perspective view of a fragmentary portion of the complete chain assembly.

DETAILED DESCRIPTION

Figure 4:
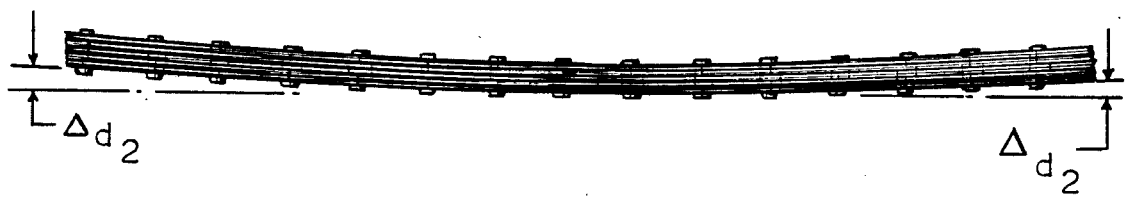
FIG. 4 is a plan view of an extended chain assembly along its longitudinal axis, illustrating the preferred degree of lateral flexure (i.e., arcuateness) required of the chain assembly hereof.

It is now in order to describe in a best mode embodiment, the details of the method and apparatus for making a chain assembly for a window operator.

Referring to FIGS. 1, 2, 3 and 4, in particular, a chain assembly made in accordance with the method of the present invention is shown. In FIG. 1, a chain assembly 1 of a window operator 22 is shown supporting in its open position, a swinging window unit 2 of a skylight window assembly 3. The drawing of FIG. 1 serves to illustrate that the chain assembly 1 has substantial rectilinearity along its longitudinal dimension when in its extended configuration, and also sufficient lateral flexure for conforming to the arcuate traverse of a swinging window unit 2 from its liner 4.

In FIG. 2, a section of the chain assembly hereof is shown, wherein two link plates of identical geometry are placed back to back with rivets passing through holes formed therein. The drawing illustrates how a single link plate can be used in constructing the chain assembly.

In FIG. 3, a chain assembly 1 constructed pursuant to the method hereof, is shown extended along a planar surface, which illustrates that a chain assembly so constructed will possess the required degree of rigidity and longitudinal rectilinearity, formed without the requirement of "overbending" operations discussed hereinbefore. The parameter $d_1$ signifies the degree to which the chain assembly deviates from longitudinal rectilinearity.

In FIG. 4, the chain assembly 1 of FIGS. 1, 2 and 3 is shown longitudinally extended and disposed on its link plates along a planar surface, which illustrates that a chain assembly constructed in accordance with the method hereof will possess the required degree of lateral flexure formed without the requirement of subsequent "overbending" operations. As discussed hereinbefore, a sufficient degree of lateral flexure and substantial rigidity and rectilinearity of a chain is required in skylight chain operator applications, and when using desired metals such as stainless steel, overbending operations cannot be used as corrective measures. As illustrated in FIG. 4, the tolerance parameter $d_2$ provides a measure of the lateral flexure of the chain assembly. It has been empirically discovered that in the case of skylight chain operator applications, the tolerance parameter $d_2$ in an unloaded condition preferably should be within the range of 5/16 to about ⅜ of an inch for a chain assembly length of about 13.5 inches comprising about 27 link lengths in the preferred embodiment hereof.

Figure 5:
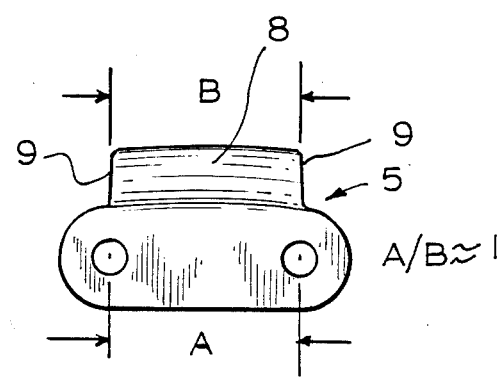
FIG. 5 is a side view of a link of a chain assembly for a window operator.
Figure 6:
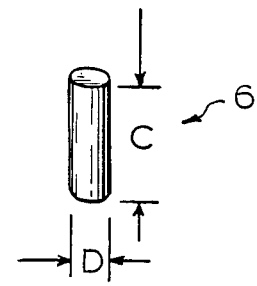
FIG. 6 is a side view of a rivet blank for use in forming the chain assembly of the present invention.

Referring to FIGS. 5 and 6, a link (plate) 5 and (rivet) blank 6 are shown, respectively. The link 5 comprises a plate 7 having a flange 8 bent therein, which in cooperation with other flanges of adjacent links, allows the chain assembly 1 to extend in a substantially rectilinear configuration. In the link 5, a hole (i.e., circular aperture) is formed under each edge 9 of the flange 8. In view of the high tolerances needed for the individual components of the chain assembly having the aforementioned structural properties, a "fine blanking" process can be used to form the geometry of the link (plates) 5, and the holes and bends in flange 8 introduced therein to ensure that such components are fabricated having the aforementioned tolerances.

The distance B is hereinafter designated as the length measure from one edge 9 of the flange 8 to the other. The distance A is hereinafter designated as the distance between the holes, measured from center to center. It has been discovered that "B" cannot be larger than "A" by 0.0005 inches if a resulting chain assembly is to be formed having an acceptable measure of longitudinal rectilinearity. Using the fine blanking process step of the method hereof, such tolerances can be achieved As for the diameter D of the (rivet) blanks 6, it has been discovered that diameter tolerances is preferably maintained within ±0.00025 of an inch, if the sufficient lateral flexure of the chain assembly is to be obtained. However, hitherto, the standard tolerance for stainless steel cold headed rivets has been ±0.005 of an inch.

Using the "fine blanking" process step of the method of the present invention, diameter tolerances of holes in link plates are preferably maintained within at least ±0.00025 of an inch, and higher tolerances can be obtained using the fine blanking process.

State-of-the-art fine blanking equipment available from American Feintool, Inc. of Cincinnati, Ohio, has been found to be satisfactory for fabricating the link plates 5 within the required design tolerances of the preferred embodiment. One advantage of using the fine blanking process is that each link plate is completely fabricated in a single operation, eliminating the inaccuracy stemming from moving the link plate 5 through progressive tooling operations where tolerances typically change. Another advantage is that with the fine blanking process, the link plates so produced are flat, thereby eliminating the problem of unflat parts produced with conventional stamping and punching operations. Other advantages of fine blanking are the elimination of secondary operations, such as, for example, the need to drill holes, grinding for finish and thickness, countersinking, and milling the legs.

Regarding the length C of the blanks, it has also been discovered that the tolerance is preferably maintained to about ±0.001 of an inch. The fabrication of blanks 6 within the aforementioned tolerance limits, can be produced by precisely drawing wire using conventional techniques, and precisely shearing the wire into a plurality of predetermined lengths.

Referring to FIGS. 8A, 8B, 8C, 8D, 8E, 8F and 8G, the various steps of the method hereof are illustrated.

Figure 8A:
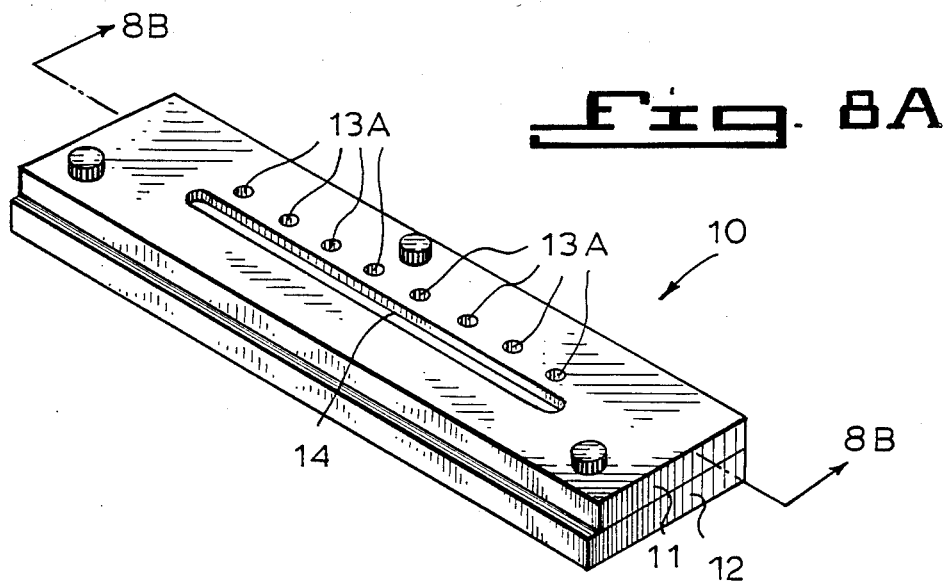
FIG. 8A is a perspective view of the holding fixture used in the manufacture of the chain assembly of the present invention.
Figure 8B:
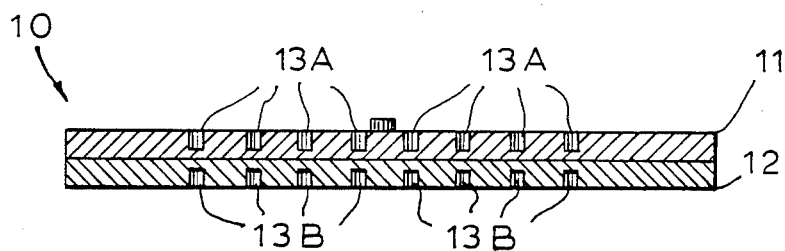
FIG. 8B is a sectional side view of the holding fixture of FIG. 8A.

In FIG. 8A, a holding fixture 10 is shown, comprising an upper plate 11 and a lower plate 12, where the upper plate 11 has a plurality of holes 13A formed therein, where the distance between each pair of holes is equal to B as designated in FIG. 5. Into each of these holes, a blank 6 precisely fits from which a rivet is to be made. Notably the depth of each hole must be a predetermined depth as to allow the ends of the blanks to protrude therefrom at a predetermined height above the surface of the holding fixture. Typically this predetermined height is in the range of about 0.035 of an inch. The diameter of each hole formed in the upper plate 13A is such that blanks 6 are precisely received therein, can be easily removed therefrom with minimal force and heads of desired dimensions are formed. Also formed in the top surface of the upper plate 11, is a longitudinally extending groove 14 running parallel with the line of holes 13A. This groove is for accommodating the downwardly extending flange 8 of link plate 5, the remainder of which is maintained in flat surface-to-surface registration with the holding fixture 10 during the rivet head forming process.

Figure 8C:
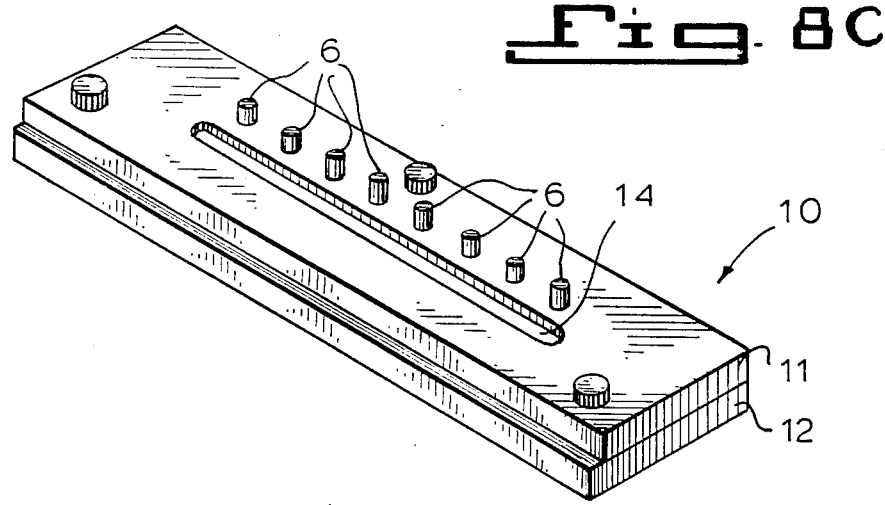
FIG. 8C is a perspective view of the holding fixture showing rivet blanks inserted therein.

As illustrated in FIG. 8C, the lower plate 12 has a plurality of holes formed 13B therein which in the preferred embodiment, coincides with the plurality of holes 13A formed in the upper plate 11. Plurality of holes 13B are used to align the holding fixture 10 with respect to apparatus for forming a head on a (rivet) blank 6, as further described in a later section of the description.

After producing a plurality of links 5 using a fine blanking process, the blanks 6 are inserted into the respective holes 13A of the holding fixture 10 as to allow one end thereof to protrude from the holding fixture 10 at a predetermined height thereabove as indicated in FIG. 8C. In connection therewith, there are a variety of ways in which the blanks 6 can be inserted into the holding fixture 10. In the preferred embodiment, a circular-wave vibration delivery system (not shown), well known in the art can be used.

As illustrated in FIG. 8D, the link plates 5 are positioned onto the blanks 6 protruding from the holding fixture 10.

As illustrated in FIG. 8D apparatus 18 for forming a rivet head onto the protruding blank 6, is positioned with respect to the holding fixture 10, lubrication is applied thereto, and then a head is formed onto each protruding blank 6 using an "orbital riveting" method, as to produce a rivet from each blank 6. In this connection, reference is made to U.S. Pat. No. 1,873,619 to Mojonnier which discloses an orbital spinning method and to U.S. Pat. No. 3,125,850 to Onulak et al. which disclose a spinning method having principal advantages of the same.

Figure 7:
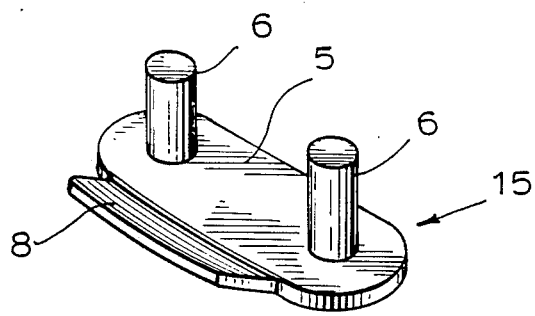
FIG. 7 is a perspective view of a link and rivet subassembly formed during an intermediate step of the method of the present invention.

Using such head forming techniques, considerable pressure can be applied to the ends of the blank 6, while the orbital spinning tool spins. Through this action heads are spun or formed upon the ends of the blanks 6 and a fully headed rivet is produced. Also, at the same time that the heads are being formed, the pressure applied also forces the plastically deformed metal of the blanks to expand into tight frictional engagement with the walls of the circular apertures formed in the link plates as illustrated in FIG. 8E, and thereby establishes what is practically an integral connection with the link plate 5. In essence, this process prevents rotation of the blank with respect to the link to which it is joined a desirable feature when forming heads using the orbital spinning method. At the end of this step of the method hereof, a link and rivet subassembly 15 is formed as illustrated in FIG. 7.

After removing the links and rivet subassemblies 15, from the holding fixture 10, the links and rivet subassemblies 15 and mating link plates 5 are assembled to form a chain assembly 16. This step is achieved by placing a mating link 5 into engagement with each link 5 containing a wire blank 6 (i.e., link and rivet subassembly) with the end of each blank 6 inserted in one aperture in the mating link 5 in a manner to form the chain assembly 16. Notably the chain assembly 16 can be achieved by manual operations, or by automated procedures.

Referring to FIG. 8F, the chain assembly 16 is shown positioned onto a guide fixture 17, as to dispose the ends of the rivets without heads formed thereon accessible to apparatus for forming a head 18. The guide fixture 17 in the preferred embodiment, includes a bottom plate 20 and two parallely spaced-apart walls 19A and 19B mounted thereon forming a guide channel 21 with the distance between the walls 19A and 19B substantially equal to the height of the link and rivet subassembly 15. The chain assembly 16 can be positioned into the guide channel 21 with the "orbitally spun" heads disposed against the bottom plate 20 of the channel 21, and the unheaded ends of the (rivet) blanks 6 facing toward apparatus for forming heads 18.

Using a conventional spinning method, heads can be spun onto the unheaded ends of the blanks 6 while the chain assembly 16 is so positioned in the guide fixture 17. Notably, since each rivet blank 6 is secured to its respective link plate 5, the rivet blank 6 is not free to spin, and therefore will allow a head to be formed thereon using a conventional spinning method. Forming rivet heads using the spinning method does not require great pressure and intrinsically provides sufficient clearance between the underside of heads and adjacent surface of link plates. This clearance between each head and link plate, when additively combined in an assembled chain assembly, provides the desired degree of lateral flexure of the chain assembly.

Once positioned in the guide fixture 17, light lubrication is applied to the ends of the rivet blanks 6 without heads, and a head is spun (i.e., formed) thereon using a conventional spinning method. After this step in the method hereof, a completed chain assembly 19 is formed as illustrated, in part, in FIG. 8G.

In accordance with the principles of the present invention, the manufacture of the chain assembly involves forming links with bends and apertures, and wire blanks having a diameter matched to the apertures. The blanks 6 are inserted into the links 5, and using an orbital spinning method, for example, heads are formed onto the ends of the blanks 6 to form rivets. Mating links 5 are then placed into engagement with each link containing wire blanks, where the end of each blank 6 is inserted in one aperture in the mating link 5, in a manner to form a chain assembly 16. Using a conventional spinning method, heads are formed on the other end of each blank 6 to complete interlocking of the links 5 and blanks 6 in forming the chain assembly 16.

It will be noted that the method of the present invention is amendable to automation, and therefore can be implemented using a rotary table with several stations, or using an assembly line format as with most automatable procedures.

Further modification of the present invention herein disclosed, will occur to persons skilled in the art to which the present invention pertains, and all such modifications are deemed to be within the scope and spirit of the present invention defined by the appended claims.

What is claimed is:

1. A chain for opening a window or the like, comprising:
    a plurality of interconnected links, each of said links including a plate portion and a flange portion extending at an angle with respect to said plate portion, each of said links being formed from a noncorrosive material which is not amenable to overbending;
    a pair of openings extending through said plate portions of each of said links, said openings each having a diameter, the diameter of said openings being formed with tolerances not exceeding 0.00025 inch;
    a plurality of rivets extending, respectively, through each of said openings and connecting said links, each of said rivets including first and second heads connected by a substantially straight, cylindrical shank, said rivets being formed from cylindrical blanks, the diameters of said blanks being within tolerances of 0.00025 inch;
    said links being constructed and interconnected so as to provide longitudinal rigidity so that said interconnected so links can be used to push a window or the like, to provide lateral flexibility to conform to an arcuate path traversed by a swinging window or the like, and to provide longitudinal flexibility to allow each of said interconnected links to freely rotate about said respective rivets between a first position providing said longitudinal rigidity and a second position wherein said interconnected links assume a curved configuration.

2. Chain as described in claim 1 wherein said links are arranged first and second interconnected pairs of links, said first pairs of said links being arranged, respectively, in alternating and overlapping sequence with said second pairs of links, said first pairs of links being arranged such that said flange portions of each pair of links extend toward each other, said second pair of links being arranged such that said flange portions of each pair of links extend away from each other and said plate portions of each second pair of links adjoin each other, said adjoining plate portions of each of said second pairs of links extending, respectively, between said plate portions of the respective first pairs of links respectively connected to said second pairs of links.

3. A chain as described in claim 1 wherein each of said rivets is in tight frictional engagement with one of said links, there being a clearance between said rivet and another of the links through which said rivet passes, said clearance providing lateral flexibility of the interconnected links.

4. A chain as described in claim 1 wherein said material is stainless steel.

5. A chain as described in claim 1 wherein none of said rivets includes a hollow formed therein, each of said rivets being of solid construction.

* * * * *

UNITED STATES PATENT AND TRADEMARK OFFICE
CERTIFICATE OF CORRECTION

PATENT NO. : 4,941,316

DATED : July 17, 1990

INVENTOR(S) : Stephen K. Bechtold

It is certified that error appears in the above-identified patent and that said Letters Patent is hereby corrected as shown below:

Column 1, Line 44, after "tension" insert --,--;
Column 1, Line 65, after "liner" insert --,--;
Column 2, Line 7, after "also" insert --,--;
Column 2, Line 12, after "techniques" insert --,--;
Column 2, Line 48, after "curvature" insert --,--;
Column 2, Line 50, after "results" insert --,--;
Column 5, Line 47, after "thereon" insert --,--;
Column 6, Line 54, after "achieved" insert --.--;
Column 7, Line 30, after "Notably" insert --,--;
Column 7, Line 33, after "Typically" insert --,--;
Column 7, Line 62, after "art" insert --,--;
Column 7, Line 66, delete "18" insert therefor --14--;

UNITED STATES PATENT AND TRADEMARK OFFICE
CERTIFICATE OF CORRECTION

PATENT NO. : 4,941,316

DATED : July 17, 1990

INVENTOR(S) : Stephen K. Bechtold

It is certified that error appears in the above-identified patent and that said Letters Patent is hereby corrected as shown below:

Column 8, Line 21, after "joined" insert --,--;

Column 8, Line 39, after "thereon" insert --,--;

Column 8, Line 45, after "thereon" insert --,--;

Column 10, Line 17, before "chain" insert --A--;

Column 10, Line 18, after "arranged" insert --as--.

Signed and Sealed this

Fifth Day of November, 1991

*Attest:*

HARRY F. MANBECK, JR.

*Attesting Officer*  *Commissioner of Patents and Trademarks*